(12) United States Patent
Nakajima

(10) Patent No.: US 11,633,989 B2
(45) Date of Patent: Apr. 25, 2023

(54) TIRE

(71) Applicant: Sumitomo Rubber Industries, Ltd., Hyogo (JP)

(72) Inventor: Koichi Nakajima, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 104 days.

(21) Appl. No.: 17/351,939

(22) Filed: Jun. 18, 2021

(65) Prior Publication Data

US 2021/0402828 A1   Dec. 30, 2021

(30) Foreign Application Priority Data

Jun. 24, 2020  (JP) .............................. JP2020-108901

(51) Int. Cl.
*B60C 11/13* (2006.01)
*B60C 11/04* (2006.01)
*B60C 11/03* (2006.01)

(52) U.S. Cl.
CPC ............. *B60C 11/042* (2013.01); *B60C 11/13* (2013.01); *B60C 2011/0339* (2013.01)

(58) Field of Classification Search
CPC . B60C 11/13; B60C 11/1307; B60C 11/1315; B60C 2011/1338
See application file for complete search history.

(56) References Cited

U.S. PATENT DOCUMENTS

2001/0032691 A1   10/2001   Ohsawa

FOREIGN PATENT DOCUMENTS

| DE | 102009003531 A1 | * | 8/2010 | ......... B60C 11/0309 |
|---|---|---|---|---|
| EP | 2390116 A1 | * | 11/2011 | ............. B60C 11/13 |
| JP | H10-76810 A | | 3/1998 | |
| JP | 2005-067246 A | | 3/2005 | |
| JP | 2011-093392 A | | 5/2011 | |
| JP | 2012-218472 A | | 11/2012 | |
| KR | 970016623 U | | 5/1997 | |
| KR | 20-2013-0001511 U | | 3/2013 | |

OTHER PUBLICATIONS

JPH1076810 machine translation.*
DE 102009003531 machine translation.*
EP 2390116 machine translation.*
The extended European search report issued by the European Patent Office dated Nov. 12, 2021, which corresponds to European Patent Application No. 21180596.5-1012 and is related to U.S. Appl. No. 17/351,939.

* cited by examiner

*Primary Examiner* — Robert C Dye
*Assistant Examiner* — Wendy L Boss
(74) *Attorney, Agent, or Firm* — Studebaker & Brackett PC

(57) ABSTRACT

The tire includes a tread portion 2 having at least one groove 3 that includes two groove walls 6. At least one of the groove walls 6 has a protrusion 10 that protrudes from the groove wall 6. The protrusion 10 includes at least two ribs 11 that extend in a length direction of the groove 3 and are spaced from each other in the tire radial direction, and a joining portion 12 for joining the ribs 11 to each other. Each rib 11 protrudes from the groove wall 6 so as to form such an inclination that the rib 11 is inclined outward from the groove wall 6 in a tire radial direction.

16 Claims, 7 Drawing Sheets

TIRE

BACKGROUND OF THE INVENTION

Field of the Invention

The present invention relates to a tire.

Description of the Background Art

In general, a tread portion of a tire has grooves formed for drainage. If so-called "stone-trapping" in which a small stone is caught and held by the groove occurs, a groove bottom or a groove wall may be damaged. Various tires in which, for example, protrusions for preventing the stone-trapping are disposed in the groove bottoms or the groove walls in order to prevent the stone-trapping, have been suggested (see, for example, Japanese Laid-Open Patent Publication No. 2005-067246 and Japanese Laid-Open Patent Publication No. 2011-093392).

SUMMARY OF THE INVENTION

The above-described tires can be expected to exhibit the effect of inhibiting the stone-trapping to a certain degree. However, an effect of positively removing a stone that has been caught once in the groove is small, and improvement has been required.

The present disclosure has been made in view of the aforementioned problem, and a main object of the present disclosure is to provide a tire that can exhibit excellent anti-stone-trapping performance.

The present disclosure is directed to a tire that includes a tread portion having at least one groove that includes two groove walls. At least one of the groove walls has a protrusion that protrudes from the groove wall. The protrusion includes at least one rib extending in a length direction of the groove. The rib protrudes from the groove wall so as to form such an inclination that the rib is inclined outward from the groove wall in a tire radial direction. The rib has a flat leading end surface at a portion farthest from the groove wall in a direction along the inclination.

In the tire of the present disclosure, on a cross-section orthogonal to the length direction of the groove, the leading end surface preferably has at least 1.0 mm of a linearly extending portion.

In the tire of the present disclosure, on a cross-section orthogonal to the length direction of the groove, an angle of the leading end surface relative to a line normal to the tire at the leading end surface is preferably 0 to 50°.

In the tire of the present disclosure, the protrusion is preferably disposed at each of both the groove walls.

In the tire of the present disclosure, an angle of the inclination relative to a line normal to the tire at the groove wall is preferably 25 to 80°.

In the tire of the present disclosure, a shape of the rib is preferably a parallelogram, on a cross-section orthogonal to the length direction of the groove.

In the tire of the present disclosure, the protrusion preferably includes at least two ribs spaced from each other in the tire radial direction. In the at least two ribs, a rib disposed closer to a groove bottom side preferably has a smaller angle for the inclination.

In the tire of the present disclosure, in the at least two ribs, a rib disposed closer to the groove bottom side preferably has a greater angle for the leading end surface.

In the tire of the present disclosure, a rib height of the rib is preferably 6% to 40% of a groove width of the groove.

In the tire of the present disclosure, a rib thickness of the rib is preferably 50% to 150% of a rib height from the groove wall.

In the tire of the present disclosure, the protrusion preferably includes at least two ribs spaced from each other in the tire radial direction, and a joining portion for joining the ribs to each other.

In the tire of the present disclosure, a length of the joining portion in the length direction of the groove is preferably greater than a rib thickness of the rib along the groove wall.

In the tire of the present disclosure, the number of the ribs on the one groove wall is preferably three to seven.

In the tire of the present disclosure, the tread portion has the at least one groove including the two groove walls. At least one of the groove walls has the protrusion that protrudes from the groove wall. The protrusion includes at least one rib extending in the length direction of the groove. The rib protrudes from the groove wall so as to form such an inclination that the rib is inclined outward from the groove wall in the tire radial direction. The rib has the leading end surface at a position farthest from the groove wall in the direction along the inclination.

In the tire of the present disclosure, the rib that is inclined in the specific direction can inhibit a stone from entering the groove. Even if a stone is held in the groove, the rib that is inclined in the specific direction acts to press the stone outward in the tire radial direction by the elastic restoring force of the rib. Thus, the stone is moved outward in the tire radial direction according to the rotation of the tire, and is easily removed outward from the groove.

Particularly, in the present disclosure, the rib has the leading end surface, and the angle of the leading end surface relative to the line normal to the tire is defined. Therefore, a great force can be applied to the stone through the leading end surface by the rib. Thus, the tire of the present disclosure can exhibit excellent anti-stone-trapping performance.

DESCRIPTION OF THE PREFERRED EMBODIMENTS

An embodiment of the present disclosure will be described below with reference to the drawings.

Figure 1:
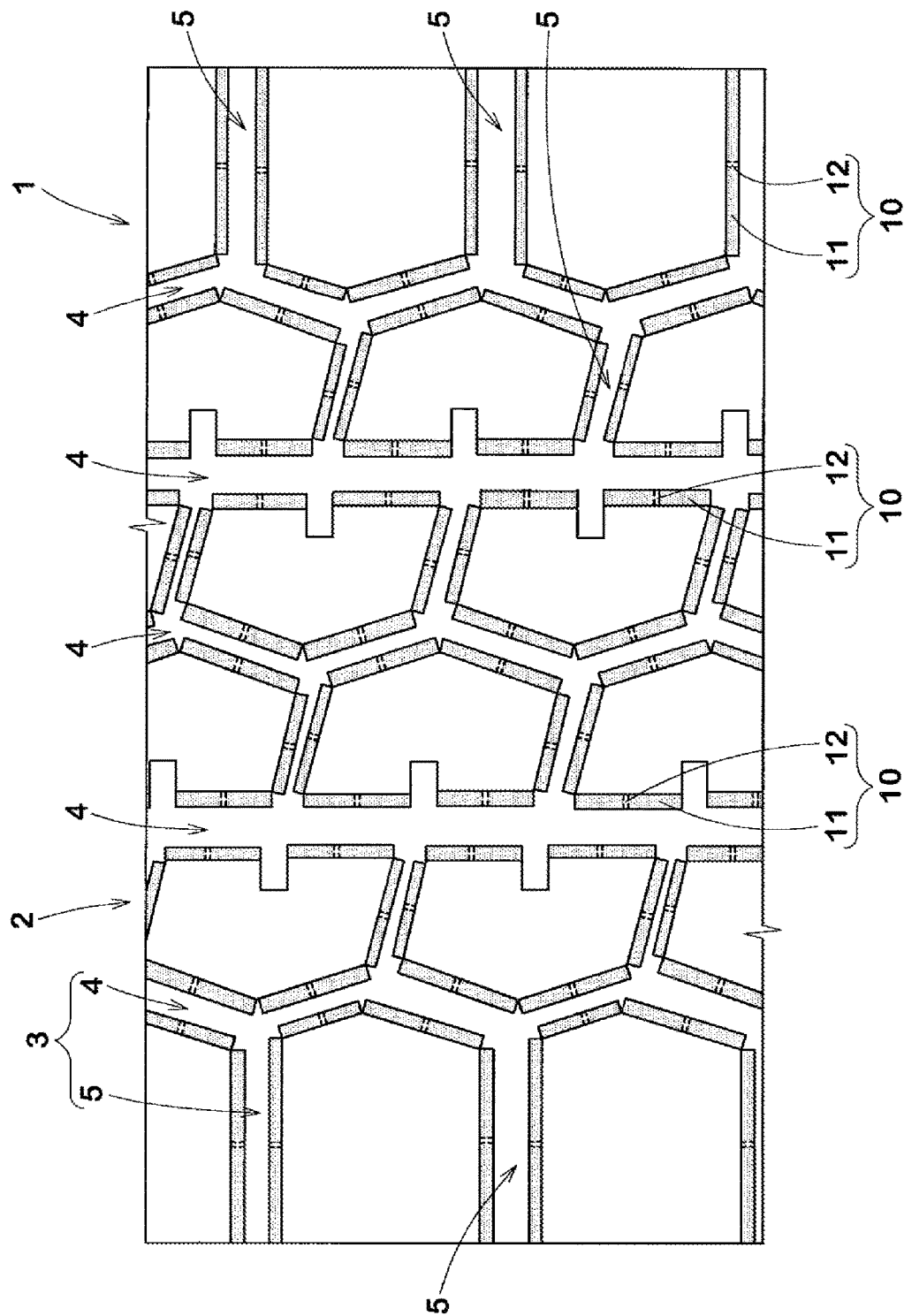
FIG. 1 is a development of a tread portion of a tire according to one embodiment of the present disclosure.

FIG. 1 is a development of a tread portion 2 of a tire 1 according to one embodiment of the present disclosure. As shown in FIG. 1, the tire 1 of the present embodiment is preferably used as, for example, a pneumatic tire for passenger cars. However, the present disclosure is not limited thereto. The tire of the present disclosure may be used as a heavy-duty pneumatic tire, a pneumatic tire for motorcycles, and a non-pneumatic tire the inside of which is not inflated with pressurized air.

In the description herein, unless otherwise specified, dimensions and the like of components of the tire are indicated as values measured in a normal state in which the tire is mounted on a normal rim and is inflated to a normal internal pressure, and no load is applied.

The "normal rim" represents a rim that is defined by a standard, in a standard system including the standard with which the tire complies, for each tire, and is, for example, the "standard rim" in the JATMA standard, the "Design Rim" in the TRA standard, and the "Measuring Rim" in the ETRTO standard.

The "normal internal pressure" represents an air pressure that is defined by a standard, in a standard system including the standard with which the tire complies, for each tire, and is the "maximum air pressure" in the JATMA standard, the maximum value recited in the table "TIRE LOAD LIMITS AT VARIOUS COLD INFLATION PRESSURES" in the TRA standard, and the "INFLATION PRESSURE" in the ETRTO standard.

The tread portion 2 has at least one groove 3 including two groove walls. The groove 3 includes a main groove 4 that continuously extends in a tire circumferential direction, and a lateral groove 5 that extends in a tire axial direction.

Figure 2:
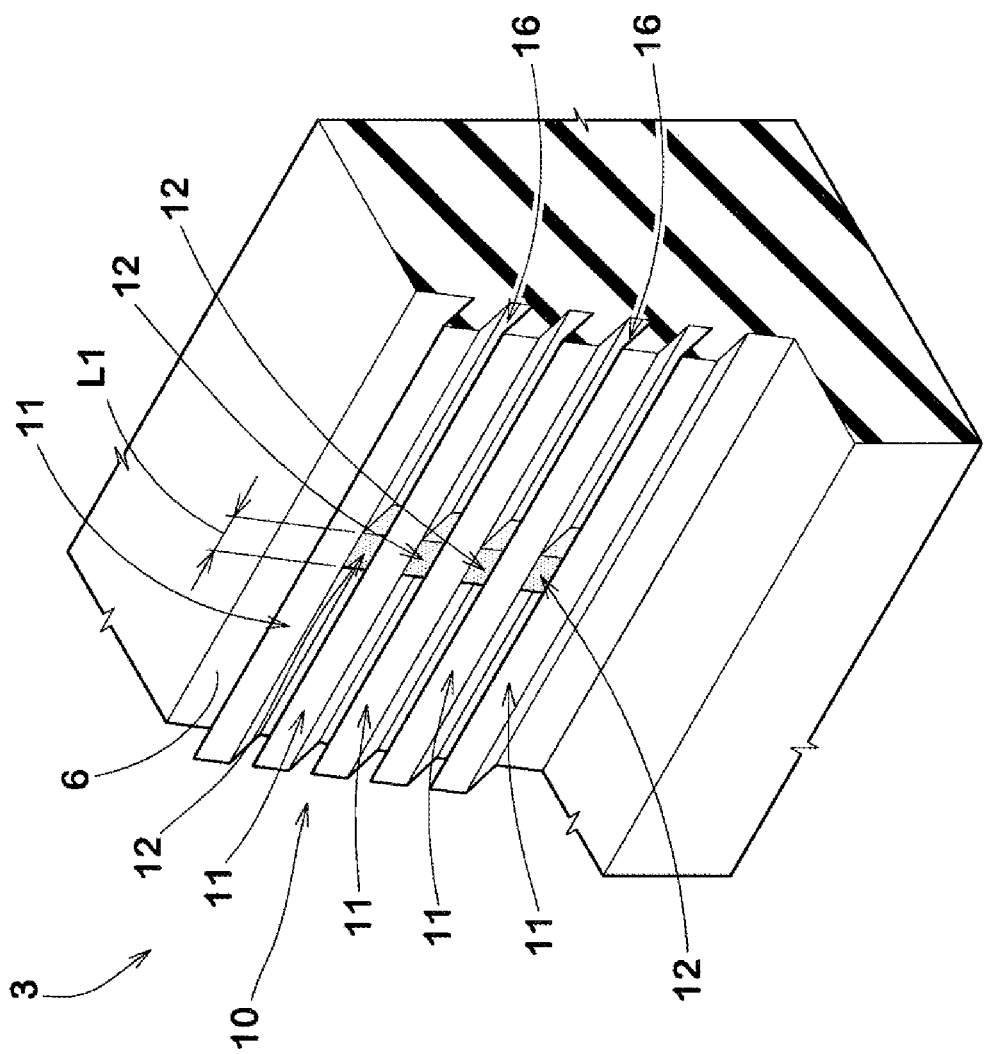
FIG. 2 is an enlarged perspective view of a groove wall of a groove shown in FIG. 1.
Figure 3:
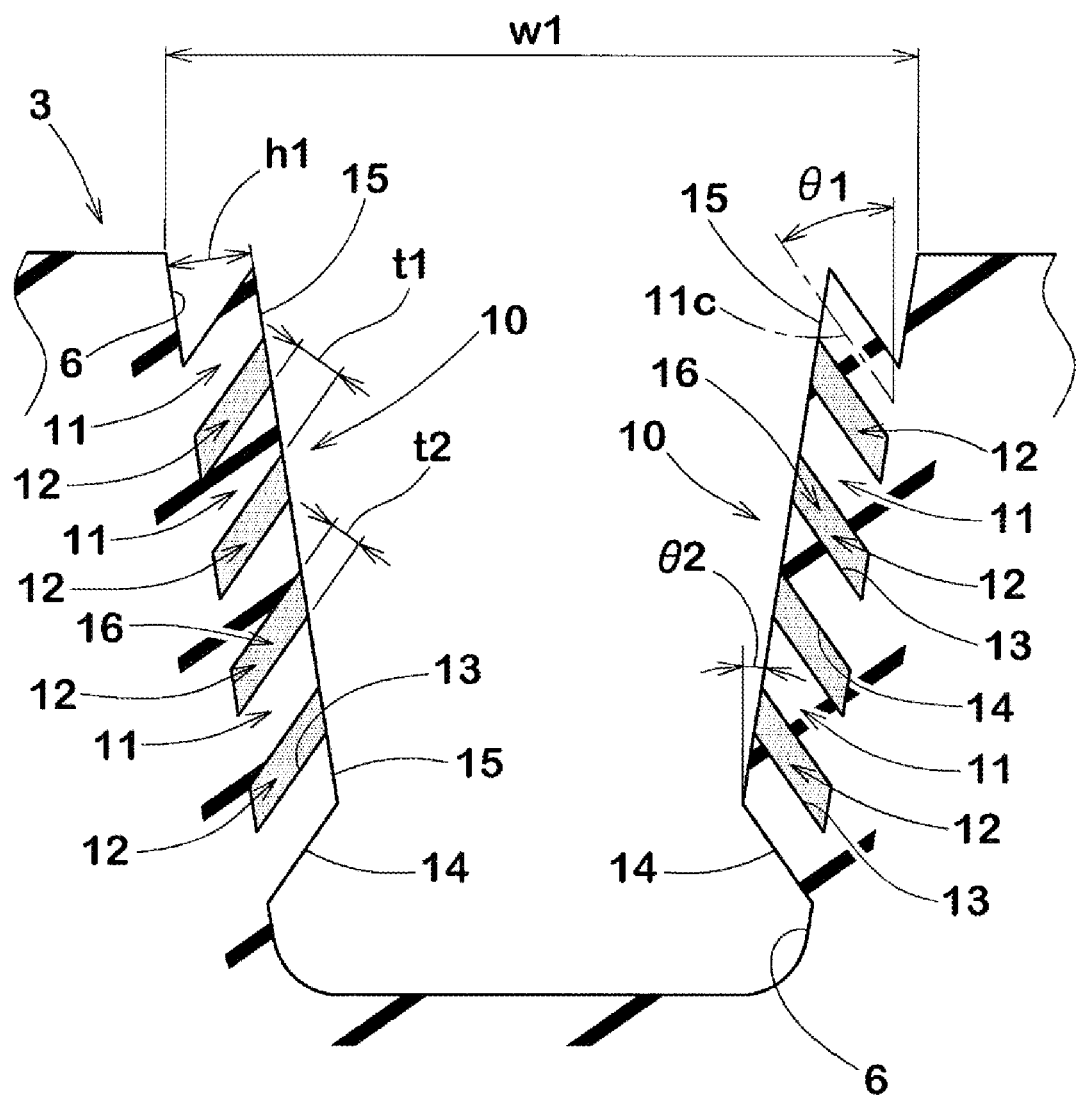
FIG. 3 is an enlarged cross-sectional view of the groove shown in FIG. 1.

FIG. 2 is an enlarged perspective view of a groove wall 6 of the groove 3. FIG. 3 is a cross-sectional view of the groove 3 on a cross-section orthogonal to the length direction (hereinafter, may be referred to as "groove length direction") of the groove 3. As shown in FIG. 2 and FIG. 3, a protrusion 10 is disposed on at least one of the groove walls 6 so as to protrude from the groove wall 6. As shown in FIG. 3, in the present embodiment, the protrusions 10 are disposed on both the groove walls 6.

As shown in FIG. 2, each protrusion 10 has at least one rib 11 that extends in the length direction of the groove 3. Each rib 11 protrudes from the groove wall 6 so as to form such an inclination that the rib 11 is inclined outward from the groove wall 6 in the tire radial direction. In other words, the rib 11 is inclined outward in the tire radial direction toward the groove wall 6 on the side opposite to the groove wall 6 at which the rib 11 is disposed.

As shown in FIG. 3, the rib 11 has a flat leading end surface 15 at a position farthest from the groove wall 6 in the direction along the inclination.

Figure 4:
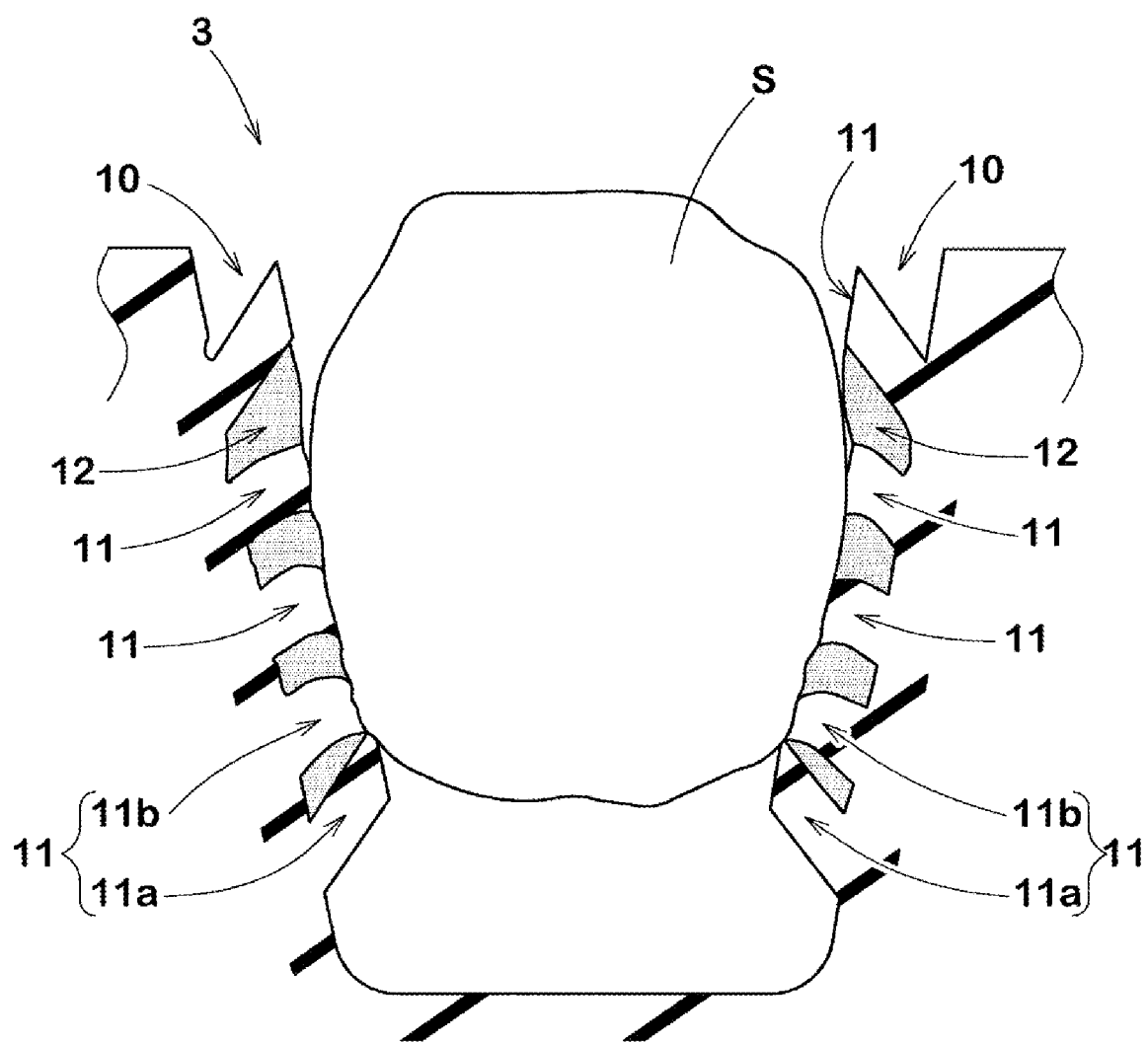
FIG. 4 is an enlarged cross-sectional view of the groove in a state where a stone is held in the groove.

In the tire of the present disclosure, the rib 11 that is inclined in a specific direction can inhibit a stone from entering the groove. As shown in FIG. 4, even if a stone S is held in the groove 3, the rib 11 that is inclined in the specific direction acts to press the stone S outward in the tire radial direction by an elastic restoring force of the rib 11. Thus, the stone S is moved outward in the tire radial direction according to the rotation of the tire, and is easily removed outward from the groove 3. Particularly, the rib 11 of the present disclosure has the flat leading end surface 15, so that a great elastic restoring force can be expected to be exerted as compared with a conventional tire in which a rib has a ridge-shaped end portion. Thus, the tire 1 of the present disclosure can exhibit excellent anti-stone-trapping performance. The flat leading end surface 15 includes at least 1.0 mm of a linearly extending portion, on the cross-section orthogonal to the groove length direction. The leading end surface 15 preferably extends so as to be flat in a range of 50% to 100% of the cross-section of a root portion of the rib 11 along the groove wall 6. The leading end surface 15 having such a structure allows the stone S to be assuredly removed.

On the cross-section orthogonal to the length direction of the groove 3, an angle $\theta 2$ of the leading end surface 15 relative to the line normal to the tire at the leading end surface 15 is, for example, 0 to 50°. The leading end surface 15 is, for example, preferably inclined outward in the tire radial direction onto the groove wall 6 at which the leading end surface 15 is formed. The angle $\theta 2$ is more preferably 10 to 25°. By the rib 11 that includes the leading end surface 15 having such a structure, a great force can be applied to the stone S through the leading end surface 15. The line normal to the tire is an imaginary straight line that extends parallel to the tire radial direction. In a case where the leading end surface 15 is a curved surface, the angle $\theta 2$ is measured with the tangent passing through the point, of the leading end surface 15, which is farthest from the groove wall 6.

As shown in FIG. 1, the length of each rib 11 is, for example, preferably not less than 50% of the length of the groove 3. In the present embodiment, the length of each rib 11 is not less than 60% of the length of the groove 3. Thus, anti-stone-trapping performance is assuredly improved. For easy understanding, in FIG. 1, the outermost ribs 11 in the tire radial direction are colored, and joining portions 12 disposed inward thereof in the tire radial direction are indicated by dashed lines.

As shown in FIG. 3, the groove wall 6 has, for example, a plurality of the ribs 11 spaced from each other in the tire radial direction. In the present embodiment, the number of the ribs 11 disposed at one groove wall 6 is three to seven. In the present embodiment, the ribs 11 have substantially the same cross-sectional shape. However, the present disclosure is not limited thereto. As described below, each rib 11 may have a different shape and/or size. The "substantially the same cross-sectional shape" means that a dimensional error that is generally included in a rubber molded product is allowed.

The shape of each rib 11 is, for example, preferably rectangular on the cross-section orthogonal to the length direction of the groove 3. In the present embodiment, the shape is a parallelogram. More preferably, in the rib 11, an outer face 13 on the outer side in the tire radial direction and an inner face 14 on the inner side in the tire radial direction are parallel to each other, and the leading end surface 15 and an imaginary surface obtained by extending the groove wall 6 at the root of the rib 11 in the tire radial direction are parallel to each other. The rib 11 having such a cross-section exhibits a great elastic restoring force and allows further improvement of anti-stone-trapping performance.

In the present embodiment, each rib 11 extends in the length direction of the groove 3 while maintaining a predetermined cross-sectional shape. However, the rib 11 of the present disclosure is not limited thereto. For example, the cross-sectional shape of the rib 11 may be changed in the length direction of the groove 3.

A rib height h1 of the rib 11 is, for example, 6% to 40% of a groove width W1 of the groove 3, and preferably 20% to 30% thereof. In the present embodiment, each of the ribs 11 on one groove wall 6 has the rib height h1 in the above-described range. The rib 11 having such a structure can enhance anti-stone-trapping performance while maintaining drainage performance at the groove 3. The rib height h1 represents a distance from the groove wall 6 to the leading end surface 15 of the rib 11 in the direction orthogonal to the groove wall 6. In a case where the leading end surface 15 and the groove wall 6 are not parallel to each other, the rib height h1 corresponds to the above-described distance from the groove wall 6 to the outer end (end farthest from the groove wall 6) of the leading end surface 15.

A rib thickness t1 of the rib 11 is preferably not less than 50% of the rib height h1, more preferably not less than 60% thereof, and even more preferably not less than 70% thereof, and is preferably not greater than 150% thereof, more preferably not greater than 120% thereof, and even more preferably not greater than 100% thereof. In the present embodiment, each of the ribs 11 on one groove wall 6 has the rib thickness t1 in the above-described range. The rib 11 having such a structure has a proper elastic restoring force, and acts to enhance anti-stone-trapping performance while maintaining drainage performance at the groove. The rib thickness t1 corresponds to a distance from the outer face 13 to the inner face 14 in the direction orthogonal to a center line 11c of the rib 11. In a case where the outer face 13 and the inner face 14 are not parallel to each other, the rib thickness t1 is the above-described distance at the root portion of the rib 11

An angle θ1 of the inclination of the rib 11 relative to the line normal to the tire at the groove wall 6 is preferably not less than 25°, more preferably not less than 30°, and even more preferably not less than 35°, and is preferably not greater than 80°, more preferably not greater than 60°, and even more preferably not greater than 50°. In the present embodiment, each of the ribs 11 on one groove wall 6 has the angle θ1 in the above-described range. The angle θ1 of the inclination is defined as an angle of the center line 11c of the rib 11 relative to the line normal to the tire. The center line 11c of the rib 11 is a line that divides the thickness of the rib 11 in the direction along the groove wall 6, into two equal parts.

In the present embodiment, the leading end surfaces 15 of at least two ribs 11 are substantially disposed on the plane parallel to the groove wall 6. In a more preferable manner, the leading end surface 15 of each of the ribs 11 on one groove wall 6 is substantially disposed on the plane parallel to the groove wall 6. The "substantially" means that a dimensional error that is generally included in a rubber molded product is allowed, and displacement in the rib height direction among the leading end surfaces 15 is not greater than 1.0 mm.

In the present embodiment, the protrusion 10 includes at least two ribs 11 spaced from each other in the tire radial direction, and the joining portion 12 that joins the ribs 11 to each other. The protrusion 10 including the joining portion 12 further enhances an effect of inhibiting entrance of a stone, further enhances an elastic restoring force of the protrusion 10, and further improves anti-stone-trapping performance.

In the present embodiment, a plurality of gaps 16 between two ribs 11 are disposed in the tire radial direction. The joining portion 12 is disposed in each gap 16. In the present embodiment, one joining portion 12 is disposed at the center of one gap 16 in the groove length direction. Thus, defective vulcanization molding of the protrusion 10 is effectively reduced. In another embodiment, a plurality of the joining portions 12 may be disposed in one gap 16. In this case, the joining portions 12 are preferably disposed to equally divide the length of the gap 16 such that the lengths, in the tire circumferential direction, of regions defined by both ends of the gap 16 in the groove length direction and the plurality of the joining portions 12 are equal to each other. Thus, stiffness of the protrusion 10 is effectively enhanced.

In a case where a plurality of the joining portions 12 are disposed in the groove length direction, for example, one joining portion 12 is preferably disposed at an interval of a groove length of 20 to 50 mm Thus, excellent anti-stone-trapping performance can be obtained while defective vulcanization molding is reduced.

A thickness t2 of the gap 16 is, for example, 50% to 80% of the rib thickness t1, and is preferably 60% to 70% thereof. In the present embodiment, each gap 16 has the thickness t2 in the above-described range. By the gap 16 having such a structure being disposed, for example, a great elastic restoring force is exhibited when the adjacent ribs 11 such as an innermost rib 11a and a rib 11b disposed outward of the rib 11a as shown in FIG. 4 come into contact with each other by deformation of the groove 3, and, consequently, removal of a stone in the groove is facilitated. The thickness t2 of the gap 16 corresponds to a distance from the outer face 13 of the rib 11 to the inner face 14 of the rib 11 opposing the rib 11 of the outer face 13 in the direction orthogonal to the center line 11c of the rib 11. In a case where the outer face 13 and the inner face 14 are not parallel to each other, the thickness t2 is the above-described distance at the root portion of the rib 11. In a case where the outer face 13 and the inner face 14 are not parallel to each other, the thickness t2 of the gap 16 at the root portion of the rib 11 is preferably 50% to 80% of the rib thickness t1 at the root portion of the rib 11.

A length L1 (shown in FIG. 2) of the joining portion 12 in the groove length direction is, for example, preferably greater than the rib thickness t1. Specifically, the length L1 of the joining portion 12 is 110% to 150% of the rib thickness t1. The joining portion 12 having such a structure effectively enhances an elastic restoring force of the rib 11.

As shown in FIG. 2, the joining portions 12 are preferably disposed at the same position in the groove length direction among the gaps 16. Thus, exhibition of a great elastic restoring force can be expected at a portion where the plurality of the joining portions 12 are aligned in the tire radial direction. However, the present disclosure is not limited thereto. The joining portions 12 may be, for example, disposed so as to be dispersed in the groove length direction in the gaps 16.

As shown in FIG. 1, in the present embodiment, each of the main grooves 4 and the lateral grooves 5 has the rib 11. Thus, anti-stone-trapping performance is further improved.

Figure 5:
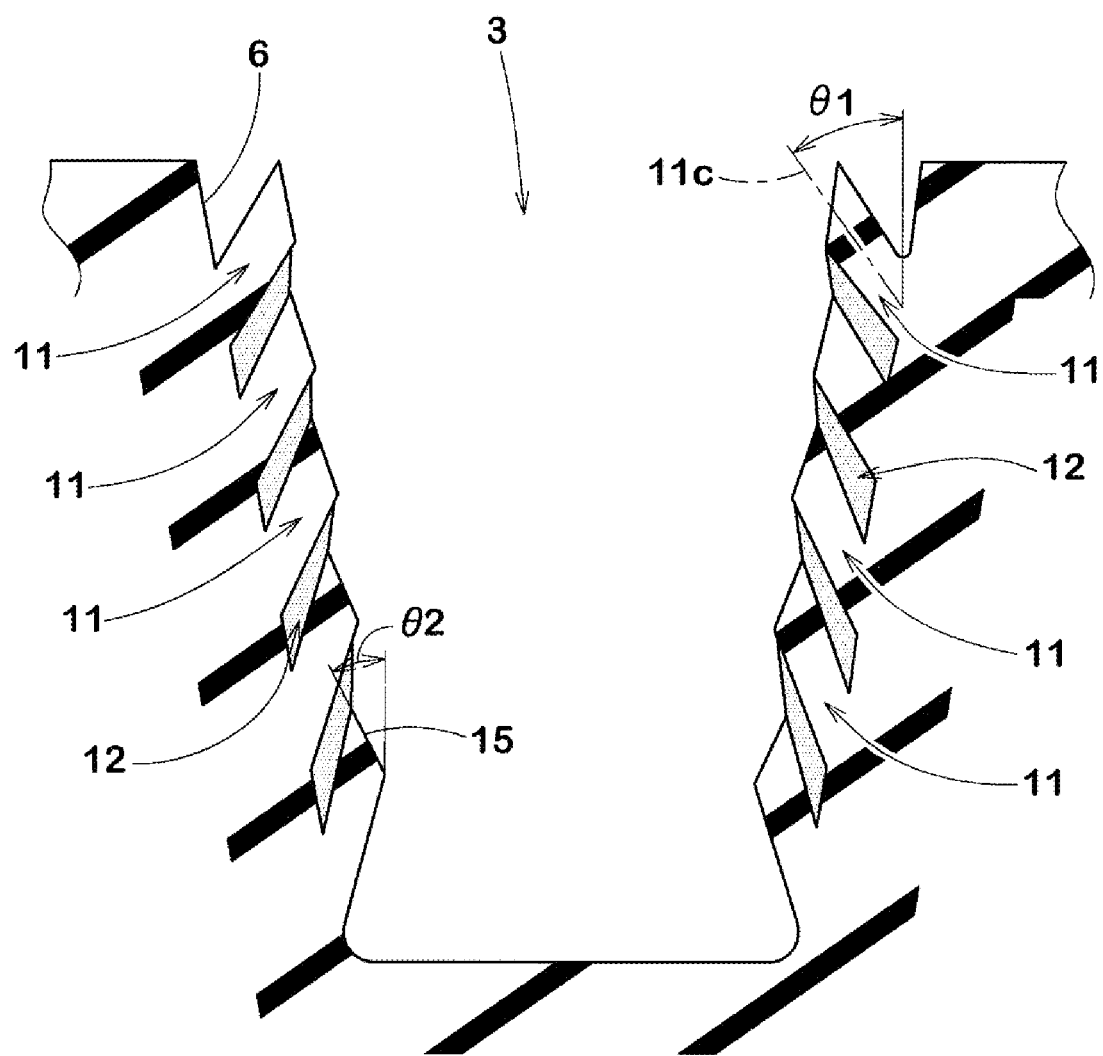
FIG. 5 is an enlarged cross-sectional view of a groove according to another embodiment.

FIG. 5 is a cross-sectional view of the groove 3 according to another embodiment of the present disclosure. In FIG. 5, the same components as in the above-described embodiment are denoted by the same reference characters, and the description thereof is omitted. As shown in FIG. 5, in the present embodiment, in at least two ribs 11, the rib 11 disposed closer to the groove bottom side has a smaller angle θ1 for the inclination. More specifically, in all of the plurality of the ribs 11 on one groove wall 6, the rib 11 disposed closer to the groove bottom side has the smaller angle θ1 for the inclination. In the present embodiment, the angle θ1 is preferably not less than 25°, more preferably not less than 30°, and even more preferably not less than 35°, and is preferably not greater than 80°, more preferably not greater than 50°, and even more preferably not greater than 45°.

In the present embodiment, in at least two ribs 11, the rib 11 disposed closer to the groove bottom side has a greater angle θ2 for the leading end surface 15. More specifically, in all of the plurality of the ribs 11 on one groove wall 6, the rib 11 disposed closer to the groove bottom side has the greater angle θ2 for the leading end surface 15. In the present embodiment, the angle θ2 of the leading end surface 15 is, for example, 2 to 30° and preferably 4 to 10°.

Figure 6:
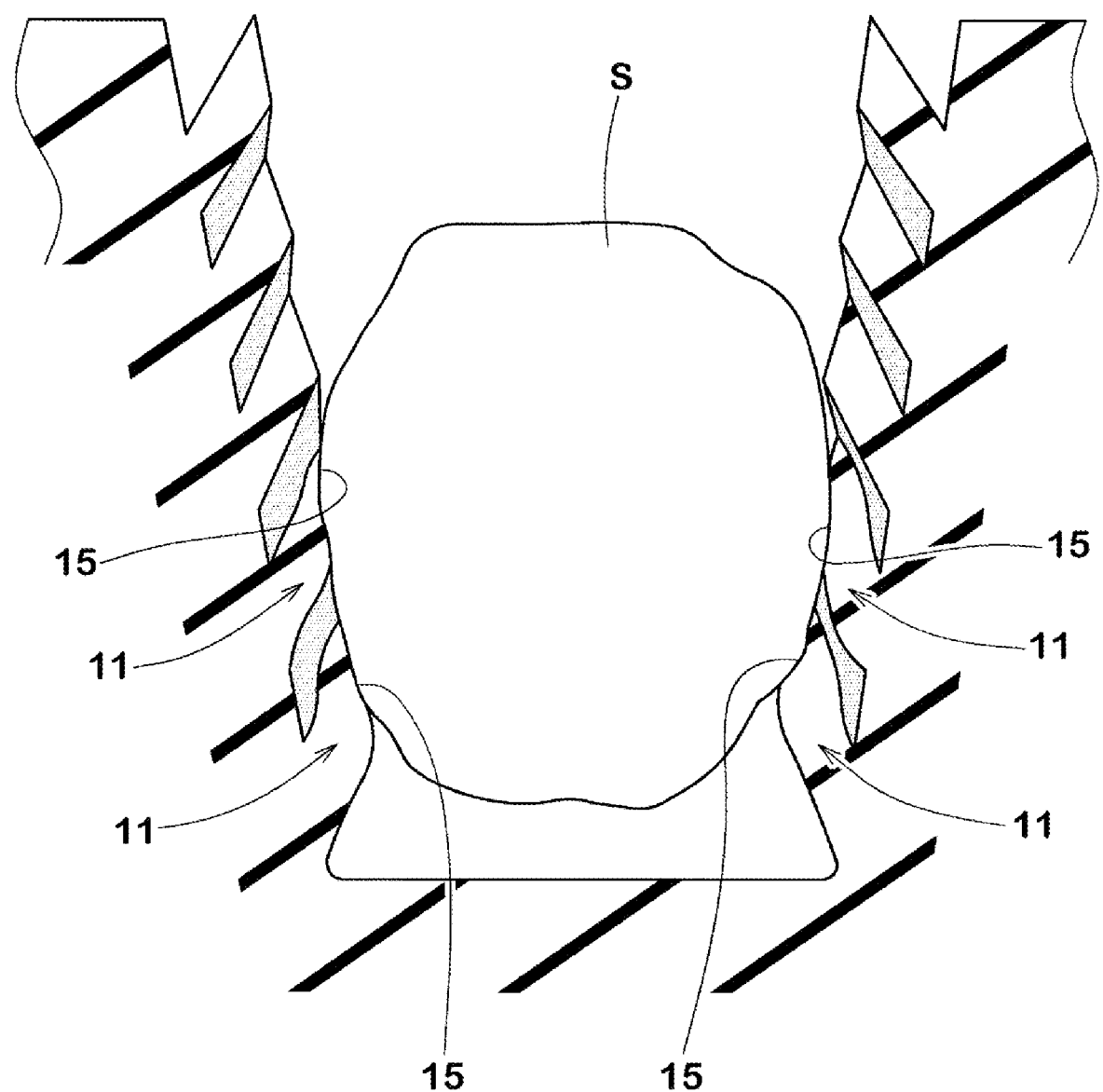
FIG. 6 is an enlarged cross-sectional view of the groove in which a stone is held in the groove shown in FIG. 5.

In the present embodiment, as shown in FIG. 6, in a case where the stone S is moved into a portion near the groove bottom, the leading end surface 15 of the rib 11 on the groove bottom side is pressed by the stone S, the rib 11 is easily compressed and deformed, and a great elastic restoring force easily acts on the stone. Therefore, in the present embodiment, more excellent anti-stone-trapping performance can be expected.

The tire according to the embodiment of the present disclosure has been described above in detail. However, the present disclosure is not limited to the above-described specific embodiment, and various modification can be made.

EXAMPLES

Figure 7A:
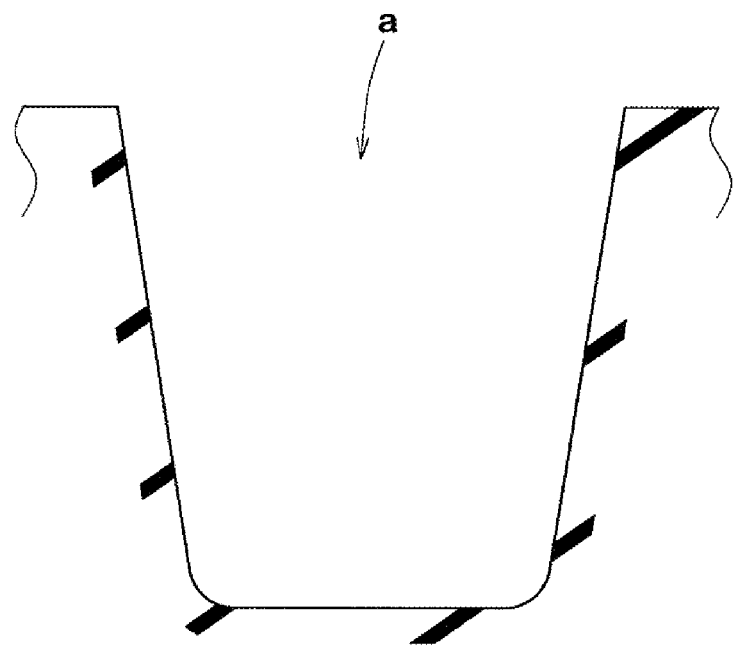
FIG. 7A is an enlarged cross-sectional view of a groove of comparative example 1.
Figure 7B:
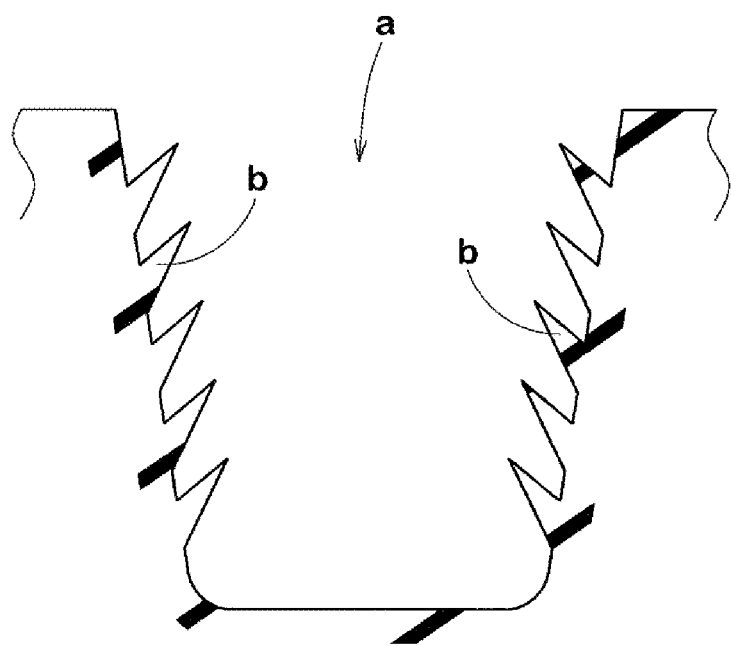
FIG. 7B is an enlarged cross-sectional view of a groove of comparative example 2.

A tire having the basic pattern shown in FIG. 1 and a size of 205/85R16 was produced as a sample tire. A sample tire in which a groove a had no protrusions was produced as comparative example 1 as shown in FIG. 7A. A sample tire having a groove a in which a rib b substantially had no leading end surface was produced as comparative example 2 as shown in FIG. 7B. A sample tire in which the angle θ2 of the leading end surface was 0° was produced as comparative example 3. A sample tire in which the angle θ2 of the leading end surface was 55° was produced as comparative example 4. The tires of comparative examples 1 to 4 had substantially the same pattern as shown in FIG. 1 except for the above-described portions. Each test tire was tested for anti-stone-trapping performance. Specifications common to the test tires, and a testing method are as follows.

Rim on which the tire was mounted: 16×5.5
Tire internal pressure: 600 kPa
Test vehicle: four-wheel-drive vehicle having engine displacement of 2500 cc
Positions at which tires were mounted: all wheels
<Anti-Stone-Trapping Performance>

The test vehicle was caused to run on a gravel road over a certain distance, and all the stones that entered the grooves were collected, and the total weight thereof was measured. The results are each indicated as an index with the total weight of the stones in the comparative example 1 being 100. The less the numerical value of the index is, the more excellent anti-stone-trapping performance is.

The test results are indicated in Tables 1 to 4.

TABLE 1

|  | Comp. Ex. 1 | Comp. Ex 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Figure indicating cross-sectional shape of groove | FIG. 7A | FIG. 7B | FIG. 3 | FIG. 3 | FIG. 3 | FIG. 3 | FIG. 3 | FIG. 3 | FIG. 3 | FIG. 3 | FIG. 3 | FIG. 3 |
| Angle θ1 (°) of inclination of rib | — | 40 | 40 | 40 | 40 | 40 | 40 | 40 | 40 | 40 | 40 | 40 |
| Angle θ2 (°) of leading end surface | — | — | 0 | 2 | 4 | 10 | 15 | 25 | 35 | 45 | 50 | 55 |
| Rib height h1/groove width W1 (%) | — | 25 | 25 | 25 | 25 | 25 | 25 | 25 | 25 | 25 | 25 | 25 |
| Rib thickness t1/rib height h1 (%) | — | 90 | 90 | 90 | 90 | 90 | 90 | 90 | 90 | 90 | 90 | 90 |
| Anti-stone-trapping performance (index) | 100 | 73 | 45 | 20 | 10 | 20 | 28 | 33 | 35 | 35 | 45 | 53 |

TABLE 2

|  | Ex. 11 | Ex. 12 | Ex. 13 | Ex. 14 | Ex. 15 | Ex. 16 | Ex. 17 | Ex. 18 |
|---|---|---|---|---|---|---|---|---|
| Figure indicating cross-sectional shape of groove | FIG. 3 | FIG. 3 | FIG. 3 | FIG. 3 | FIG. 3 | FIG. 3 | FIG. 3 | FIG. 3 |
| Angle θ1 (°) of inclination of rib | 25 | 30 | 35 | 45 | 50 | 60 | 70 | 80 |
| Angle θ2 (°) of leading end surface | 4 | 4 | 4 | 4 | 4 | 4 | 4 | 4 |
| Rib height h1/groove width W1 (%) | 25 | 25 | 25 | 25 | 25 | 25 | 25 | 25 |
| Rib thickness t1/rib height h1 (%) | 90 | 90 | 90 | 90 | 90 | 90 | 90 | 90 |
| Anti-stone-trapping performance (index) | 60 | 40 | 20 | 10 | 20 | 38 | 47 | 50 |

TABLE 3

|  | Ex. 19 | Ex. 20 | Ex. 21 | Ex. 22 | Ex. 23 | Ex. 24 |
|---|---|---|---|---|---|---|
| Figure indicating cross-sectional shape of groove | FIG. 3 | FIG. 3 | FIG. 3 | FIG. 3 | FIG. 3 | FIG. 3 |
| Angle θ1 (°) of inclination of rib | 40 | 40 | 40 | 40 | 40 | 40 |

TABLE 3-continued

|  | Ex. 19 | Ex. 20 | Ex. 21 | Ex. 22 | Ex. 23 | Ex. 24 |
|---|---|---|---|---|---|---|
| Angle θ2 (°) of leading end surface | 4 | 4 | 4 | 4 | 4 | 4 |
| Rib height h1/groove width W1 (%) | 5 | 15 | 20 | 40 | 50 | 60 |
| Rib thickness t1/rib height h1 (%) | 90 | 90 | 90 | 90 | 90 | 90 |
| Anti-stone-trapping performance (index) | 60 | 30 | 20 | 50 | 55 | 60 |

TABLE 4

|  | Ex. 25 | Ex. 26 | Ex. 27 | Ex. 28 | Ex. 29 | Ex. 30 | Ex. 31 | Ex. 32 |
|---|---|---|---|---|---|---|---|---|
| Figure indicating cross-sectional shape of groove | FIG. 3 | FIG. 3 | FIG. 3 | FIG. 3 | FIG. 3 | FIG. 3 | FIG. 3 | FIG. 5 |
| Angle θ1 (°) of inclination of rib | 40 | 40 | 40 | 40 | 40 | 40 | 40 | 30 to 80 |
| Angle θ2 (°) of leading end surface | 4 | 4 | 4 | 4 | 4 | 4 | 4 | 7 to 30 |
| Rib height h1/groove width W1 (%) | 25 | 25 | 25 | 25 | 25 | 25 | 25 | 25 |
| Rib thickness t1/rib height h1 (%) | 40 | 50 | 70 | 100 | 120 | 150 | 170 | 90 |
| Anti-stone-trapping performance (index) | 60 | 50 | 25 | 10 | 40 | 55 | 60 | 22 |

According to the test results, it was confirmed that the tires of the examples exhibited excellent anti-stone-trapping performance Particularly, it was confirmed that the rib having the leading end surface as in the present disclosure significantly improved anti-stone-trapping performance as compared with the rib that substantially had no leading end surface as shown in FIG. 7B.

What is claimed is:

1. A tire comprising:
a tread portion having at least one groove that includes two groove walls, wherein
each of the two groove walls has a protrusion that protrudes from the groove wall,
the protrusion includes at least two ribs extending in a length direction of the groove,
each of the at least two ribs protrudes from the groove wall so as to form such an inclination that each of the at least two ribs is inclined outward from the groove wall in a tire radial direction,
each of the at least two ribs has a flat leading end surface at a portion farthest from the groove wall in a direction along the inclination,
a shape of each of the at least two ribs is a parallelogram having a rib thickness t1, on a cross-section orthogonal to the length direction of the groove,
the at least two ribs are spaced apart with a gap t2 on the cross-section orthogonal to the length direction of the groove, and
the rib thickness t1 of each of the ribs is larger than the gap t2.

2. The tire according to claim 1, wherein, on the cross-section orthogonal to the length direction of the groove, the leading end surface has at least 1.0 mm of a linearly extending portion.

3. The tire according to claim 1, wherein, on the cross-section orthogonal to the length direction of the groove, an angle of the leading end surface relative to a line normal to the tire at the leading end surface is 0 to 50°.

4. The tire according to claim 1, wherein an angle of the inclination relative to a line normal to the tire at the groove wall is 25 to 80°.

5. The tire according to claim 1, wherein
the protrusion includes the at least two ribs that are spaced from each other in the tire radial direction, and
in the at least two ribs, a rib disposed closer to a groove bottom side has a smaller angle for the inclination.

6. The tire according to claim 5, wherein, in the at least two ribs, a rib disposed closer to the groove bottom side has a greater angle for the leading end surface.

7. The tire according to claim 1, wherein a rib height of each of the at least two ribs is 6% to 40% of a groove width of the groove.

8. The tire according to claim 1, wherein the rib thickness of each of the at least two ribs is 50% to 150% of a rib height from the groove wall.

9. The tire according to claim 1, wherein the protrusion includes the at least two ribs that are spaced from each other in the tire radial direction, and a joining portion for joining the at least two ribs to each other.

10. The tire according to claim 9, wherein a length of the joining portion in the length direction of the groove is greater than the rib thickness of each of the at least two ribs along the groove wall.

11. The tire according to claim 1, wherein the protrusion includes three to seven ribs.

12. The tire according to claim 1, wherein a first angle of the leading end surface relative to a line normal to the tire at the leading end surface is larger than an angle of the inclination relative to a line normal to the tire at the groove wall.

13. A tire comprising:
a tread portion having at least one groove that includes two groove walls, wherein each of the two groove walls has a protrusion that protrudes from the groove wall, the protrusion includes at least two ribs extending in a length direction of the groove, each of the at least two ribs protrudes from the groove wall so as to form such an inclination that each of the at least two ribs is inclined outward from the groove wall in a tire radial direction, each of the at least two ribs has a flat leading end surface at a portion farthest from the groove wall in a direction along the inclination, wherein a shape of each of the at least two ribs is a parallelogram having a rib thickness t1, on a cross-section orthogonal to the length direction of the groove, the two ribs are spaced apart with a gap t2 on the cross-section orthogonal to the length direction of the groove, the rib thickness t1 of each of the ribs is larger than the gap t2, and wherein an angle of the inclination relative to a line normal to the tire at the groove wall is 30 to 60°.

14. The tire according to claim 13, wherein the angle of the inclination relative to the line normal to the tire at the groove wall is 35 to 50°.

15. A tire comprising:

a tread portion having at least one groove that includes two groove walls, wherein each of the two groove walls has a protrusion that protrudes from the groove wall, the protrusion includes at least two ribs extending in a length direction of the groove, each of the at least two ribs protrudes from the groove wall so as to form such an inclination that each of the at least two ribs is inclined outward from the groove wall in a tire radial direction, each of the at least two ribs has a flat leading end surface at a portion farthest from the groove wall in a direction along the inclination, each of the at least two ribs has an inner face, an outer face in the radial direction and the flat leading end surface connecting between the inner face and the outer face, each of the at least two ribs has a rib thickness t1 on a cross-section orthogonal to the length direction of the groove, each of the at least two ribs are spaced apart with a gap t2 on the cross-section orthogonal to the length direction of the groove, and the rib thickness t1 of each of the ribs is larger than the gap t2.

16. The tire according to claim 15, wherein an angle of the inclination relative to a line normal to the tire at the groove wall is 25 to 80°.

* * * * *